United States Patent [19] | [11] 4,198,886
Bowers et al. | [45] Apr. 22, 1980

[54] DEFLASHING APPARATUS

[75] Inventors: Kenneth E. Bowers, Prairie Village; Stephen E. Merritt; William G. Kinslow, Jr., both of Kansas City, all of Mo.

[73] Assignee: Ethyl Development Corporation, Baton Rouge, La.

[21] Appl. No.: 941,460

[22] Filed: Sep. 12, 1978

[51] Int. Cl.[2] ................................ B26D 7/06

[52] U.S. Cl. ................................ 83/112; 83/152; 83/155; 83/279; 83/422; 83/914

[58] Field of Search ................ 83/112, 152, 155, 279, 83/422, 914

[56] References Cited

U.S. PATENT DOCUMENTS

| | | | |
|---|---|---|---|
| 3,589,228 | 6/1971 | Bourgeois | 83/914 X |
| 3,810,405 | 5/1974 | Oberloler | 83/914 X |
| 4,106,379 | 8/1978 | Spengler | 83/914 X |

*Primary Examiner*—Frank T. Yost
*Attorney, Agent, or Firm*—Donald L. Johnson; John F. Sieberth; Edgar E. Spielman, Jr.

[57] ABSTRACT

An apparatus for deflashing a plastic article is disclosed. In operation, an operator places the article having flash in a nest which positions the article so that the flash is in a horizontal plane. A powered shuttle assembly picks the article up from the nest and places it upon an anvil. The anvil has striking edges which follow the line of juncture between the article and the flash. A punch apparatus is lowered onto the article and strikes the flash at the line of juncture disjoining the flash from the article. The power shuttle then removes the article without the flash to a discharge point. Optionally, at the discharge point, there may be provided an orientation assembly wich orients the deflashed article so that it may be placed upon a conveyor belt which carries the article to a collection point.

10 Claims, 11 Drawing Figures

10
130
12
3
6

180
186
178
188
184
182
183
183
103
136
144
146
132
106
198
194
193a
196
196b
54
105
140
134
142
138
29
190
192
28
30

DEFLASHING APPARATUS

BACKGROUND OF THE INVENTION

Plastic bottles having integrally molded handles are popular in the marketplace for packaging products such as chlorinated water, detergents, fabric conditioners, etc. These handled containers are conventionally produced by blow mold process in which, as a first step, a parison is created by extruding a tubular section of plastic material. The parison is then confined within the interior of a split mold and air is introduced into the parison to expand it into conformity with the interior of the mold. In the formation of handled bottles the tubular parison is initially expanded prior to the closing of the molds to make sure that the handle portion of the mold will close upon a portion of the parison. This inherently requires that the closing molds grip between them, some of the parison plastic material to produce a web of plastic material within the handle opening at the conclusion of the molding process. This web of plastic material is conventionally known in the plastic trade as "flash." Additionally, as the mold closes, a certain amount of the parison is caught between the mold faces and the region of the shoulder, thus resulting in flash on the shoulder of the completed article.

Before the handled plastic articles can be placed in commerce, this flash must be removed. There are several devices for effecting such removal such as the ones disclosed in U.S. Pat. Nos. 3,319,498 and 3,695,109. While these devices are claimed by the invertors to be effective in removing flash from the containers it has been found desirable in the industry to have available an apparatus which has low manpower requirements and a high cycle time.

It is therefore an object of this invention to provide an apparatus which is capable of deflashing containers at a high rate and which has low manpower requirements.

THE INVENTION

This invention relates to an apparatus for removing flash from a plastic article, which apparatus comprises: (a) a nest having a concave portion for receipt of an article having flash, whereby the flash is positioned in a horizontal plane; (b) an anvil having a concave portion for receipt, from the nest, of the article and having striking edges which follow the line of juncture between the article and the flash; (c) punch means for striking the flash at the line of juncture to disjoin the flash from the article; (d) power means to power the punch means to achieve the strike; and (e) powered shuttle means for moving the article having flash from the nest to the anvil and for moving the deflashed article from the anvil to a discharge point.

In operation, the article having a flash is first placed into the nest by an operator. The first portion of the shuttle means then engages the article and moves it from the nest to the anvil. As mentioned above, the anvil has striking edges which align with the line of juncture between the article and its flash. The punch means, which is integrally timed with the shuttle system, will strike downward onto the anvil to disjoin the flash from the article. The punch means is then raised so that the second portion of the shuttle system can attach itself to the deflashed article, remove it from the anvil and carry it to a discharge point. Preferably there is also provided an orienting assembly at the discharge point which will take the deflashed article from the second portion of the shuttle system and orient the article so that it can be placed bottom-down on a conveyor belt. The thus placed article is carried by the conveyor to a collection bin. The orienting assembly is mechanically and/or electrically timed with the shuttle system so that its operation is automatic and in time with the shuttle system movement.

These and other features contributing satisfaction in use and economy in manufacture will be more fully understood from the following description of a preferred embodiment of the invention when taken in conjunction with the accompanying drawings in which identical numerals refer to identical parts and in which.

Figure 1:
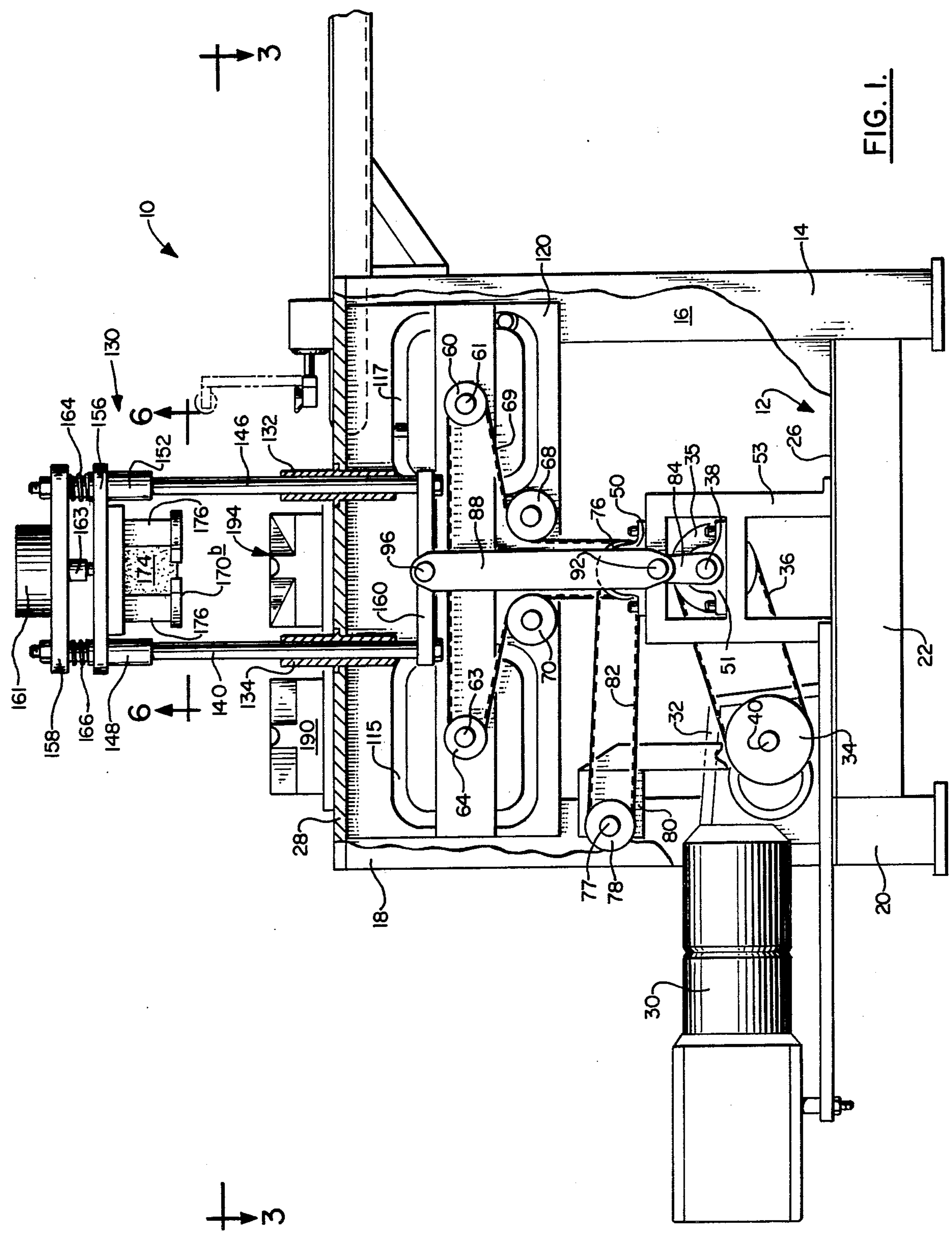
FIG. 1 is a side elevational view of a preferred embodiment of the invention in which the side panel has been partially cut away.
Figure 2:
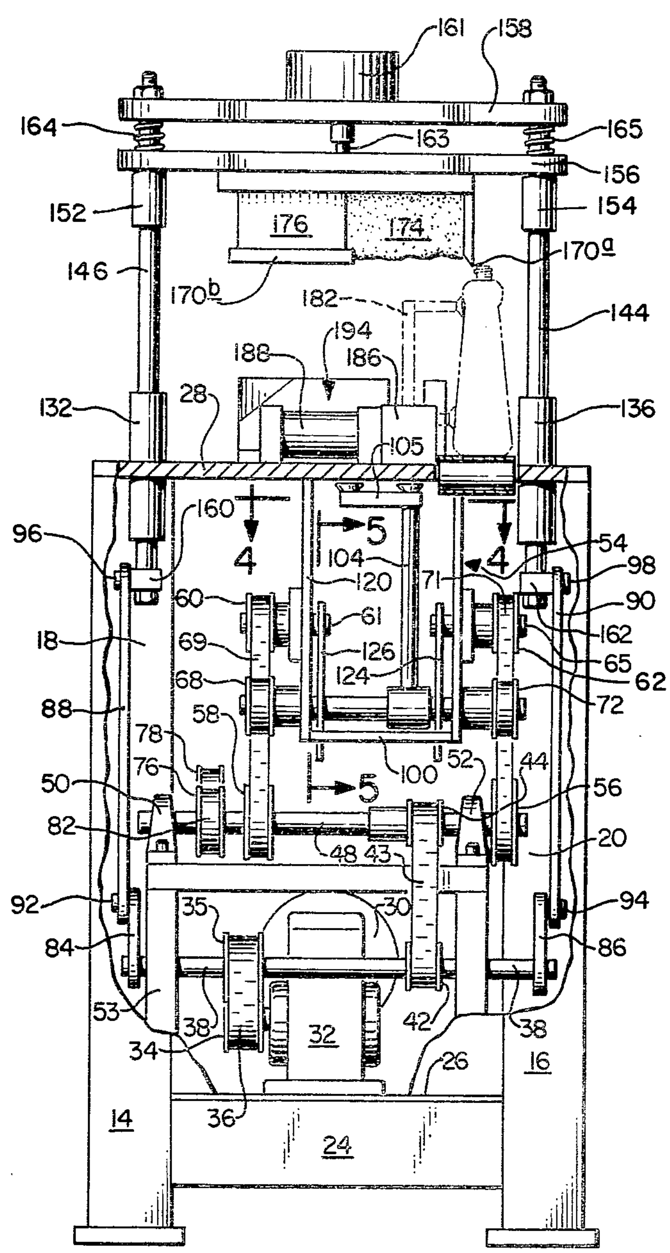
FIG. 2 is an end elevational view of the embodiment shown in FIG. 1 with an end panel partially cut away.
Figure 3:
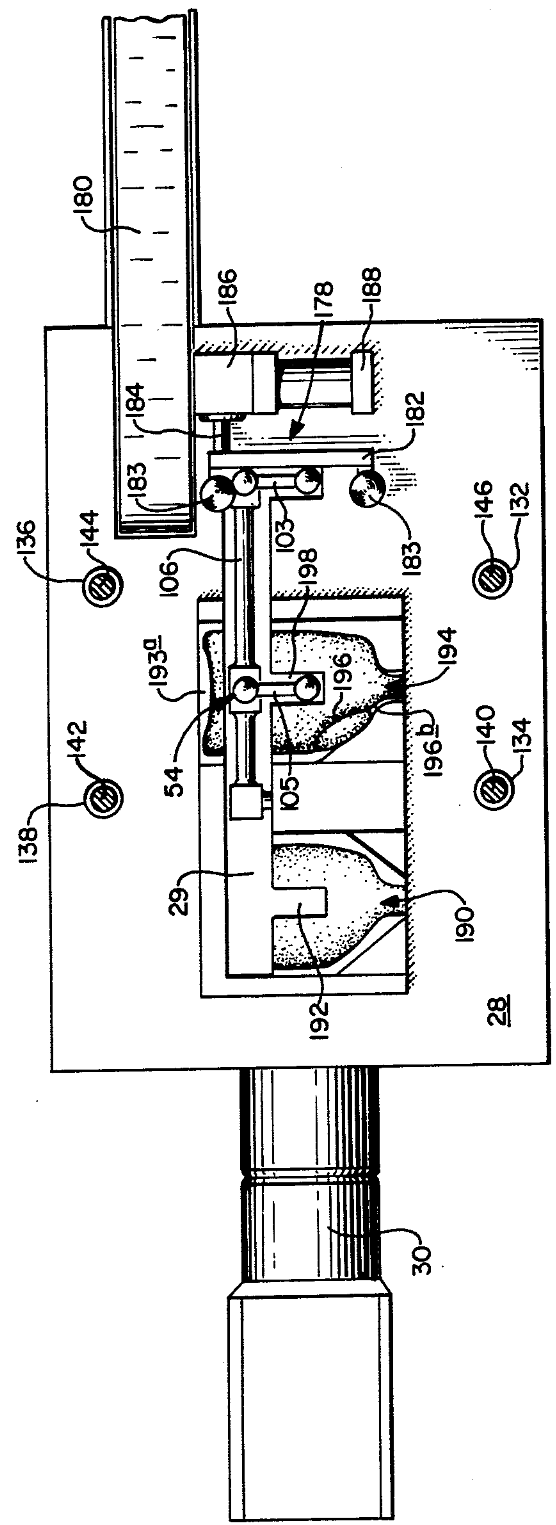
FIG. 3 is a sectional view taken through section lines 3—3 of FIG. 1.

Referring now to FIGS. 1 and 2 it can be seen that a deflashing device of this invention, generally designated by the numeral 10, is supported by a table, generally designated by the numeral 12. Table 12 has four legs, 14, 16, 18 and 20. Peripheral bracing of legs 14, 16, 18 and 20 is utilized. Two of these leg braces, leg brace 22 and leg brace 24 are shown in the drawings, it being understood that leg brace 22 has an opposite counterpart which is not shown in the drawings, as does leg brace 24. Immediately above the leg braces and resting thereon is table shelf 26. At the upper end of table 12 there is table top 28. Table top 28 has cut therein, as is shown in FIG. 3, passageway 29 for allowing for movement of shuttle assembly 54 through table top 28 as hereinafter described.

Figure 4:
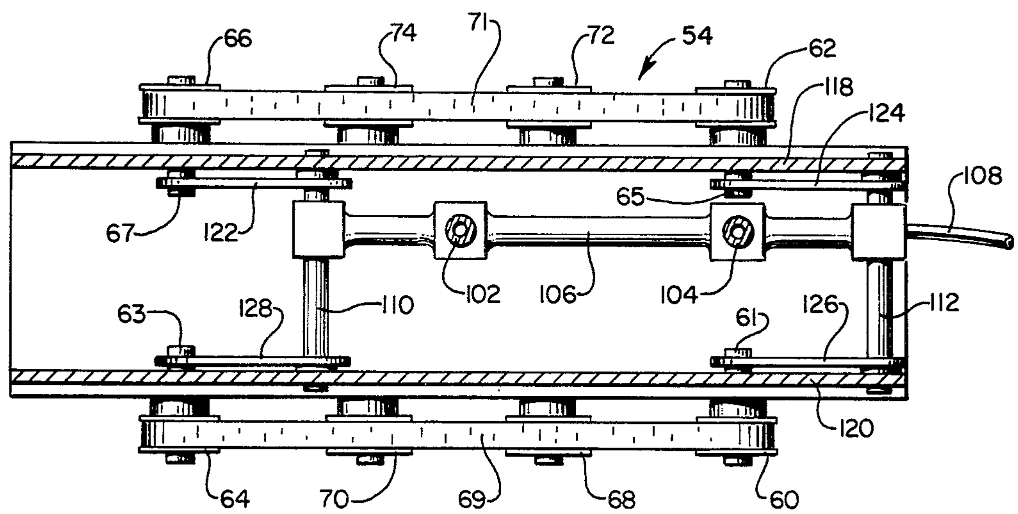
FIG. 4 is a sectional view taken through section lines 4—4 of FIG. 2.

Mounted directly beneath and to table top 28 is mounting bracket 100 which has side plates 118 and 120. To this bracket is affixed a shuttle assembly, generally designated by the numeral 54. Shuttle assembly 54, as can be seen in FIG. 4, includes a tie bar 106 which ties left cam follower shaft 110 to right cam follower shaft 112. Tie bar 106 has therein an air passageway and is connected to vacuum hose 108. Upstanding from tie bar 106 there is left vertical vacuum tube 102 and right vertical vacuum tube 104. Extending at right angles from vertical vacuum tubes 104 and 102 are cup shuttle arms 105 and 103, respectively. Both of the arms have passageways so that the vacuum from vacuum hose 108 can be communicative through tie bar 106 to vacuum cups carried by the vacuum tubes. To provide the vacuum needed, each of the cups has a small vacuum port near its center.

Figure 7:
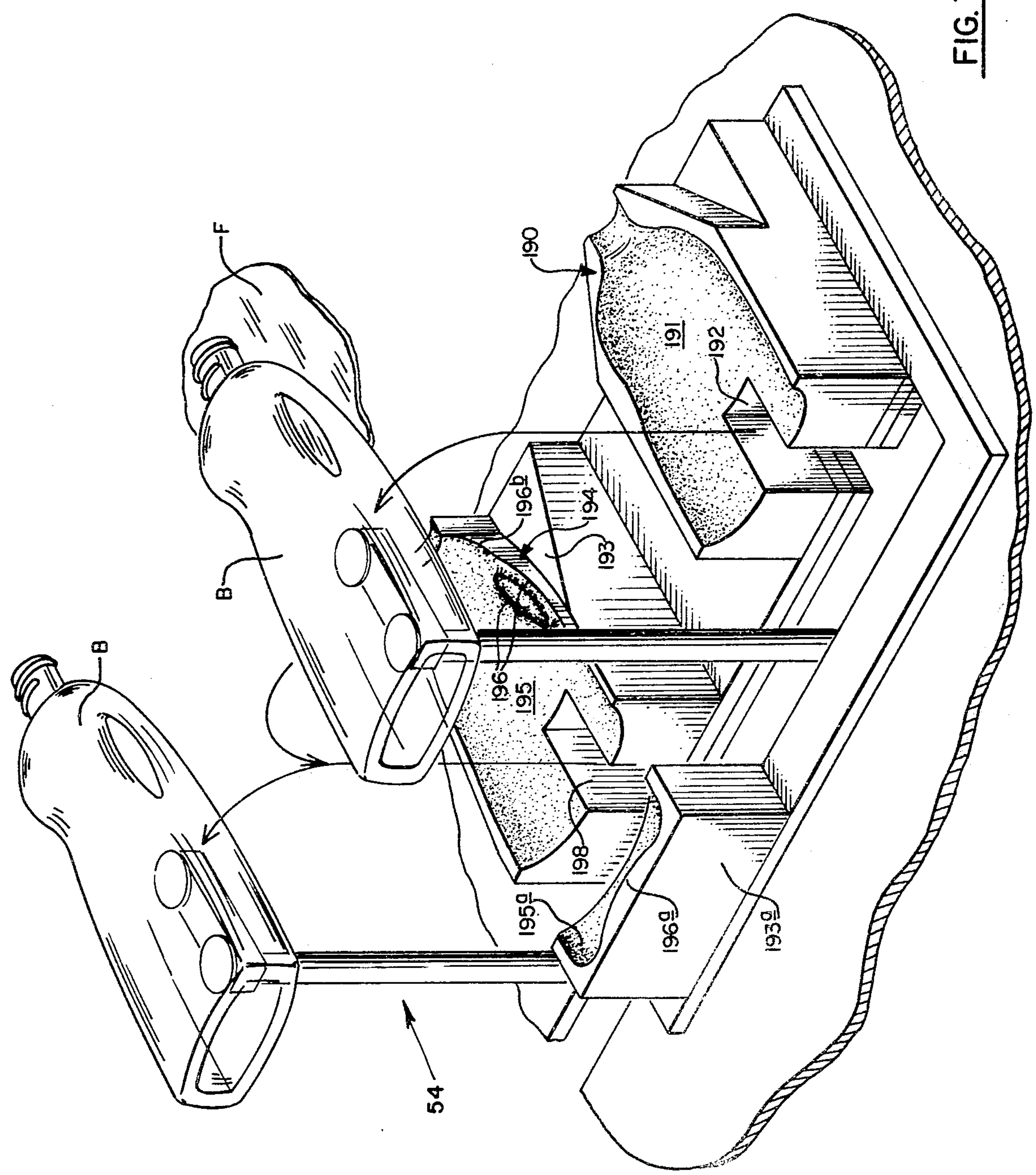
FIG. 7 is an enlarged detailed view of the nest and anvil shown in FIG. 1.

As shown in FIG. 7, shuttle assembly 54 moves on a path so that it can move the article to be deflashed through the cycle of device 10.

Power for movement of shuttle assembly 54 is provided by shuttle drive pulleys 60, 62, 64 and 66. The relationship of these drive pulleys is shown in FIGS. 1, 2 and 4. Shuttle drive pulleys 60, 62, 64 and 66 are in drive relationship with slotted cam follower links 126, 124, 128 and 122, respectively by way of shafts 61, 65, 63 and 67. Rotation of the shuttle drive pulleys results in rotation of the cam follower links. Cam follower links 122 and 128 carry within their slots left cam follower shaft 110 while cam follower links 124 and 126 carry in their slots right cam follower shaft 112. The cam follower shafts are thus powered into motion by means of their respective cam follower links. Each of the shafts extend into a pair of cam tracks cut into side plate 118 and 120.

Figure 5:
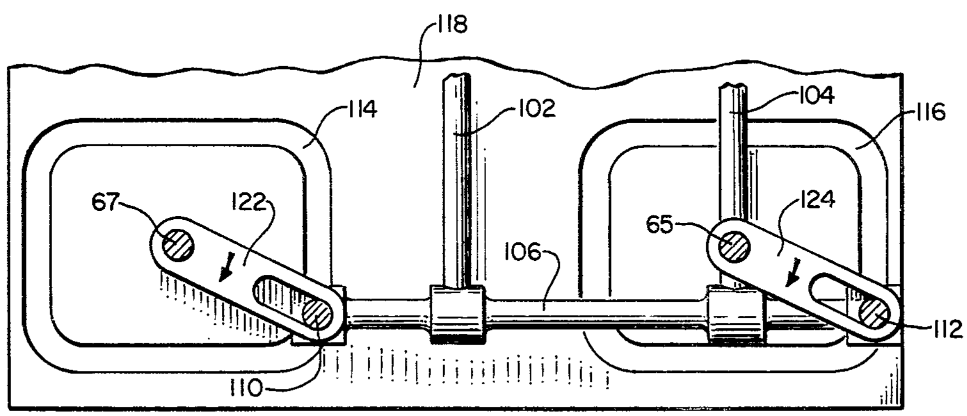
FIG. 5 is a sectional view taken through section lines 5—5 of FIG. 2.

The configuration of these tracks is generally rectangular as is shown in FIGS. 1 and 5. Cam track 114 functions along with cam track 115 in side plate 120 in guiding cam follower shaft 110. The same relationship is true for cam track 116 and its opposite counterpart in plate 120, track 117, in their guidance of right cam follower shaft 112.

The rectangular motion of cup shuttle arms 103 and 105 will enable the shuttle system to pick an article up from nest 190 and place the article onto anvil 194 and to move the deflashed container from anvil 194 to an unloading station as hereinafter described.

Atop table top 28 there is rigidly mounted a nest, generally designated by the numeral 190, and an anvil, generally designated by the numeral 194. Nest 190 has a cavity 191 which approximates the shape of the article, in the case shown in FIG. 7, a bottle B. Cavity 191 is sufficiently large to allow bottle B to be placed therein without chance of bottle B falling from nest 190. Nest 190 has a passageway 192 to allow for movement upward through nest 190 of cupped shuttle arm 105.

Anvil 194 is preferably of two portions, a top portion 193 and a lower portion **193*a*. By providing lower porton 193*a* it is insured that bottle B will be held firmly on anvil 194 when the strike to remove flash F is made. Anvil 194 has a cavity 195 and 195*a* which closely approximates the shape of bottle B. The necessity for having a separated anvil is due to the fact that room must be allowed for movement of vertical vacuum tubes 102 and 104. Passageway 198 is also made through anvil 194 to allow for passage of cup shuttle arms 103 and 105. Striking edges 196, 196*a* and 196*b* are provided against which punch 170 will act to deflash bottle B. Striking edge 196 conforms closely to the juncture of bottle B and the flash F which is located on the inside of the bottle handle. Striking edge 196*b* conforms closely to the juncture of the flash F in bottle B along its outside edges across the neck portion. Striking edge 196*a*** is optional and may be utilized when it is desirable to remove from bottle B a plastic tail which will project outward from the bottom of bottle B.

Providing the impact over strike edges 196, **196*a* and 196*b* to deflash bottle B is a punch ram, generally designated by the numeral 130. Punch ram 130 has four platen shafts 140, 142, 144 and 146. These shafts slide within platen shaft guides 134, 134, 136 and 132, respectively. As can be seen in FIG. 1, platen shaft guides are carried by table top 28. Tie bar 160 connects platen shafts 140 and 142 at their lowermost ends, while tie bar 162 connects platen shafts 144 and 146 at their bottom ends. To provide up and down motion for punch ram 130 there is provided linkage which links punch ram 130 to rotating main drive axial 38. This upward and downward motion is needed to position punch arm 130 in close proximity of anvil 194 when the strike is to be made and to move punch ram 130 from the close proximity when the bottle is to be removed from anvil 194. There are two sets of linkage, one set being connected to tie bar 160 and the other being connected to the other tie bar 162. The linkage connected to tie bar 160 includes connecting arm 88 which is attached to tie bar 160 by means of pin 96 and is attached at its other end to actuating arm 84 by means of pin 92. Actuating arm 84 is connected to rotating main drive axle 38. A set of identical linkage is provided for tie bar 162 as can be seen in FIG. 2 in which connecting arm 90 is attached to tie bar 162 by means of pin 98 at one of its ends and at its other end to actuating arm 86 by means of pin 94. Actuating arm 86 is in turn connected to main drive axle 38. By providing this type of double pivoted linkage, the rotating motion of main drive axle 38 is converted to up and down motion for punch arm 130**.

Figure 6:
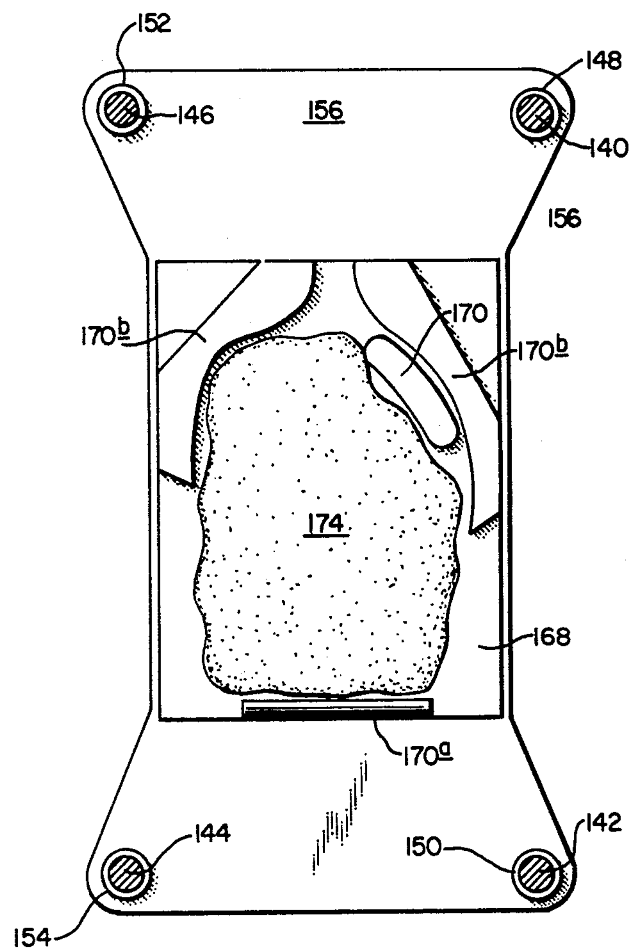
FIG. 6 is a sectional view taken through section lines 6—6 of FIG. 1.

As before noted, tie bars 160 and 162 are connected to the lowermost ends of the platen shafts. At the upper ends of the platen shafts there is connected thereto upper plate 158 which has mounted thereon double acting pneumatic cylinder 161. Pneumatic cylinder rod 163 projects through upper plate 158 and in turn is connected to platen 156. Platen 156 moves upward and downward in response to the action of double acting pneumatic cylinder 161. Guidance for this motion is obtained by having platen 156 mounted to platen guide shaft sleeves 148, 150, 152 and 154 (shown in FIG. 6) which are in sliding relationship with platen shafts 140, 142, 146 and 144, respectively. This relationship is depicted in FIGS. 1, 2, 6, 9 and 9A of the drawings. Mounted on the underside of platen 156 and facing anvil 194 are punches 170, **170*a* and 170*b*. These punches are mounted to spacer blocks 176. Spacer blocks 176 can be of varying thicknesses to insure the proper striking force of punches 170, 170*a* and 170*b*. In FIG. 6 it is seen that punch 170 has a configuration complying with the configuration of the flash within the handle of bottle B shown in FIG. 7. Punches 170*b* on the other hand have a configuration identical with the juncture of the flash on the outside of bottle B about the neck portion of bottle B. To remove the tail from the bottom of bottle B there is provided punch 170*a* which will cooperate with striking edge 196*a* as is shwon in FIG. 7. To aid in holding the article firmly in position, to prevent miscutting of flash F from bottle B, there is utilized sponge 174. Sponge 174** is soft and resiliently crushable so that it may overlay the article and aid in holding it rigidly to the anvil during the striking process.

Four springs are provided to cushion the upper travel limits of platen 156 when double acting pneumatic cylinder 161 raises platen 156 from anvil 194. Springs 164, 165 and 166 are shown in FIGS. 1 and 2 with the remaining spring not being shown.

Various drive trains, all driven by electric motor-clutch-brake assembly 30, power the raising and lowering of punch ram 130, provide movement for shuttle assembly 54 and activate the pneumatic and vacuum requirements of device 10. Off of main drive axle 38 there is driven the before-described linkage for raising and lowering punch ram 130. Powering of main drive axle 38 is achieved by the drive relationship between main drive pulleys 34 and 35 and main drive timing belt 36. As is seen in FIGS. 1 and 2, the electric motor drives gear box 32 thereby powering gear box axle 40 which has mounted thereto main drive pulley 34. The other main drive pulley, drive pulley 35, is connected to main drive shaft 38.

Powering of main drive axle 38 not only raises and lowers punch ram 130 but also, by way of secondary drive pulleys 42 and 44 in conjunction with secondary drive belt 43, drives secondary drive axle 48. Secondary drive axle 48 has mounted thereto shuttle drive pulleys 56 and 58 which are in powered relationship with shuttle drive pulleys 60, 62, 64 and 66. More particularly, shuttle drive pulley 58 drives, by way of timing belt 69, drive shaft pulleys 60 and 64, while drive shaft pulley 56 drives drive shaft pulleys 62 and 66 by way of timing belt 71. For timing belt 69 there is provided idler pulleys 70 and 68 as is shown in FIGS. 1 and 2 for maintaining the proper tension on that belt. For belt 71 there is provided a pair of similar idler pulleys. These pulleys are shown in FIG. 4.

Also driven from secondary drive axle 48 is cam limit switch 80 which is depicted in FIG. 1. This drive is provided by way of cam pulley 78 and cam pulley 76 which are connected by way of cam timing belt 82. Cam pulley 76 is mounted to secondary drive axle 48 while cam pulley 78 is mounted to cam limit switch axle 77. Cam limit switch 80 is utilized to provide timing for the application and release of the vacuum needed by shuttle assembly 54 and for providing timing needed by the unloader assembly 178 which will be hereinafter described.

The electric motor portion of electric motor-clutch-brake assembly 30 is preferably an adjustable speed DC motor thereby giving the operator of device 10 complete control over the speed at which the device will operate. Furthermore, by utilizing the clutch-brake assembly it is possible to halt the device in mid cycle and make any adjustments which may be needed.

Main drive axle 38 is rotatably mounted within a pair of bearings, one of which is bearing 51 shown in FIG. 1. Bearing 51 is mounted to bracket 53. Bracket 53 also carries a complementary bearing identical to and opposite bearing 51 for mounting of shaft 38. This latter bearing is not shown in the drawings.

Bearings are also provided for secondary drive axle 48. These bearings are bearings 50 and 52 which are mounted atop bracket 53. This mounting of secondary drive axle 48 is depicted in FIG. 2.

Figure 8:
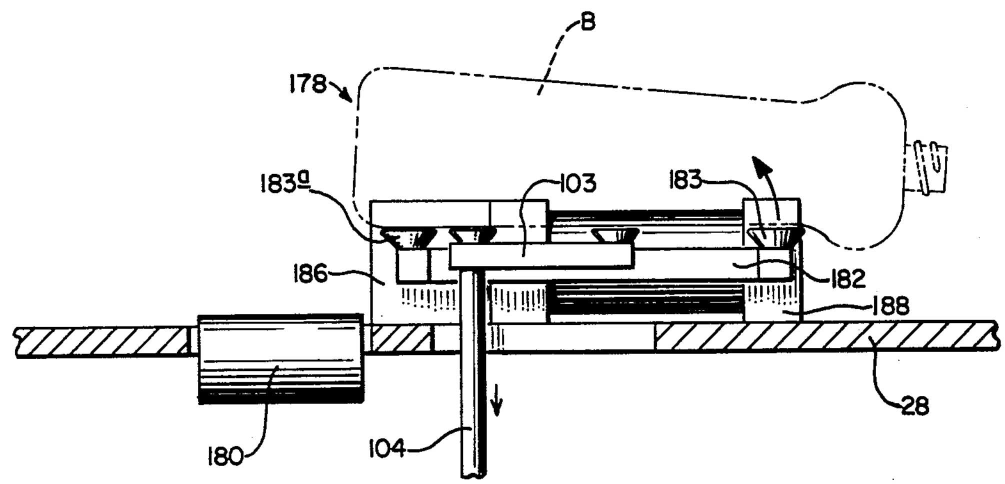
FIG. 8 is an enlarged view of the unloading orienting assembly shown in FIG. 1 with the assembly in the unload mode.
Figure 8A:
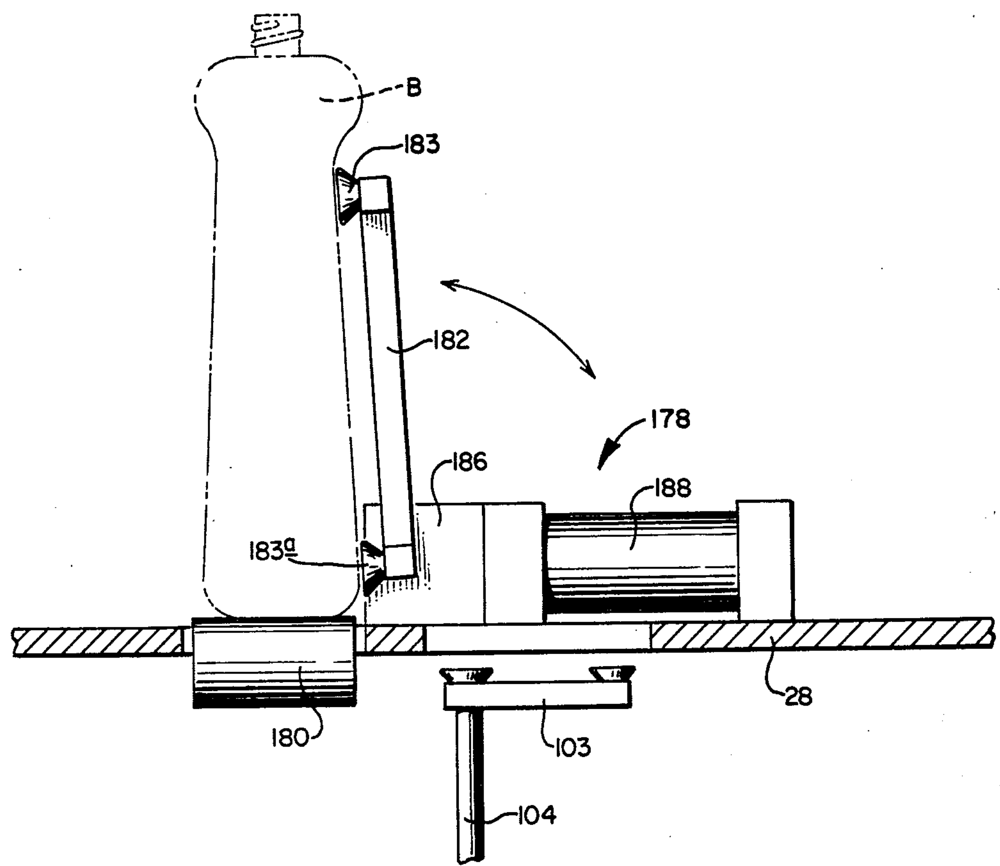
FIG. 8A is a detailed view of the unloading orienting assembly shown in FIG. 1 with the assembly in the orienting mode.
Figure 9:
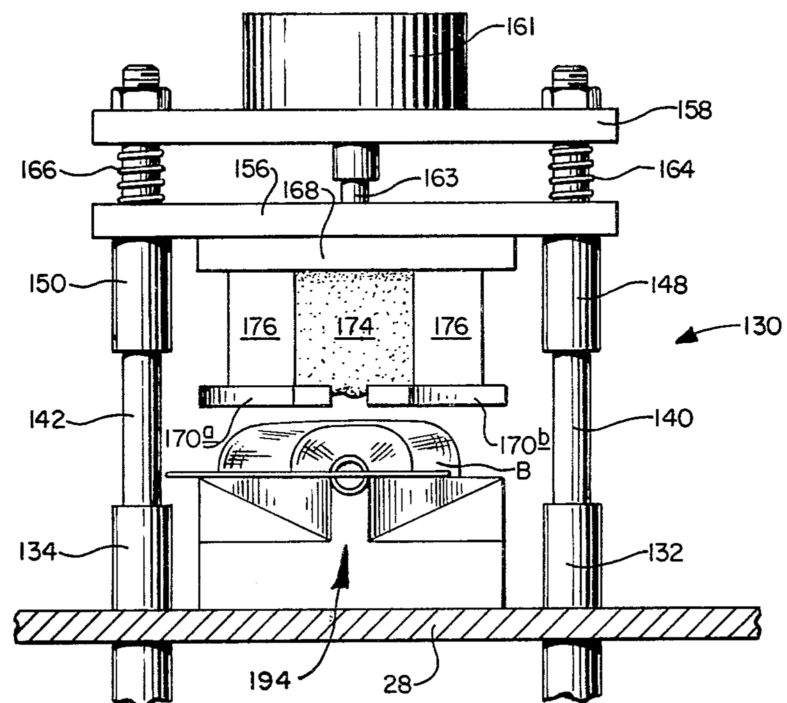
FIG. 9 is a detailed view of the anvil and punch shown in FIG. 1 with the punch beginning its downward travel.
Figure 9A:
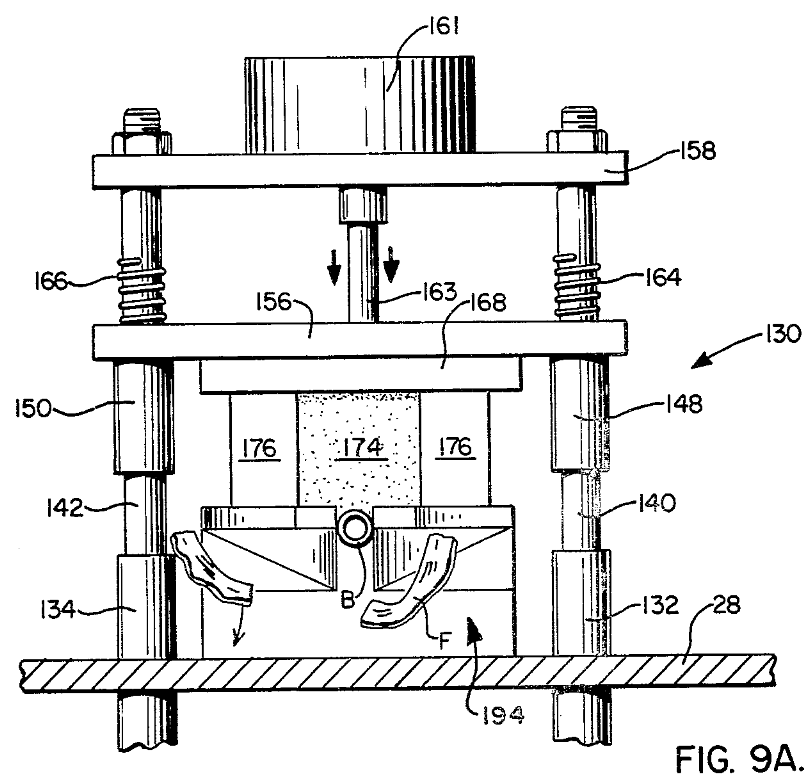
FIG. 9A is a detailed view of the punch and anvil shown in FIG. 1 with the anvil in the strike position.

After the article, bottle B, has been moved from anvil 194 to a discharge point, there may optionally be provided an unloader-orienter assembly, generally designated by the numeral 178. This assembly provides a tip-up arm 182 which has a pair of vacuum actuated suction cups 183 and **183*a*. As the vacuum is removed from the cups on the shuttle arms, the vacuum is actuated on tip-up arm suction cups 183*a* and 183 so that they will take over holding of bottle B. Cup shuttle arm 103 moves downward and returns to the anvil area for repeat of its cycle. Once bottle B is held by tip-up arm 182, double acting pneumatic cylinder 188 is actuated so as to drive a pinion across the teeth of a circular gear which pinion and gear are housed within pinion and gear housing 186 so as to cause tip-up arm 182 to rotate as is shown in FIG. 8A. In the tipped-up position bottle B is positioned on conveyor 180 and at this point the vacuum is released from cups 183 and 183*a*. After release of bottle B, double acting pneumatic cylinder 188 returns to the retracted position thereby causing the pinion to move to the rear causing downward rotation of tip-up arm 182 so that it is in the position shown in FIG. 8 and ready for receipt of the next bottle B from cup shuttle arm 103**.

By providing unloader-orienting assembly 178, bottle B is placed in a specified position so that it may be passed on to further treating stations, i.e, flame treating, labeling, etc., without the need of an additional worker to achieve same.

In operation, an operator will place a bottle having flash onto nest 190. The bottle is then moved from nest 190 to anvil 194 by means of cup shuttle arm 105 which attains a holding relationship with the bottle when the shuttle arm cups make contact therewith and a vacuum is applied between the cups and the bottle. Timing of the application of a vacuum to the shuttle arm cups is accomplished by a signal sent from cam limit switch 80 to the vacuum source. Once the bottle has been positioned onto anvil 194 the cups on shuttle arm 105 lose vacuum and thereby their hold on bottle B. Punch ram 130 is then lowered in response to the rotation of main drive axle 38 and connecting arms 88 and 90. After punch ram 130 has reached its lowermost position, double acting pneumatic cylinder 161 is actuated in response to a signal from cam limit switch 80 so as to cause punches 170, **170*a* and 170*b* to strike downwardly on striking edges 196, 196*a*, and 196*b*, respectively, to deflash bottle B. Pneumatic cylinder 161 then returns to the retract position and punch ram 130 is raised to its highest position so that the deflashed bottle can be picked up by cup shuttle arm 103 which will apply a holding vacuum to its cups upon command from cam limit switch 80. Cup shuttle arm 103 then carries the deflashed bottle to the unloader-orienter assembly 178. Unloader-orienter assembly 178 then obtains holding relationship with the deflashed bottle as the cups of cup shuttle arm 103 release from the bottle. After vacuum cups 183 and 183*a* have a hold on bottle B, double acting pneumatic cylinder 188 is actuated on command from cam limit switch 80 to cause tip-up arm 182 to rotate thereby orienting the deflashed bottle with respect to conveyor 180. The vacuum is released from coups 183 and 183*a* and double acting pneumatic cylinder 188 returns to the retract position placing tip-up arm 182** in a horizontal position awaiting the next deflashed bottle in the cycle.

Advantages of the device of this invention are numerous. Fpr example, as distinguished from prior art machines, the instant device only moves the light weight container from station to station rather than movement of the station from container to container. This advantage results in lower tooling costs and maintenance costs. Furthermore, by moving the container to the station, a higher cycle speed is possible as there is no need for bulky or cumbersome chain drives as called for by earlier deflashing machines.

What is claimed is:

1. An apparatus for removing flash from a plastic article, which apparatus comprises:

a. a nest, said nest having a concave portion for receipt of said article having flash, whereby said flash is positioned in a horizontal plane;

b. an anvil, said anvil having a concave portion for receipt, from said nest, said article having flash and having striking edges which follow the line of juncture between said article and said flash;

c. punch means for striking said flash at said line of juncture to disjoin said flash from said article;

d. power means to power said punch means to achieve said strike; and e. powered shuttle means for moving said article having flash from said nest to said anvil and for moving the deflashed article from said anvil to a discharge point.

2. The apparatus of claim 1 wherein said shuttle means has a first portion for holding said article having flash as it moves from said nest to said anvil and a second portion for holding said deflashed article as it moves from said anvil to said discharge point.

3. The apparatus of claim 2 wherein said first and second portions each comprise at least one sucton cup to which a partial vacuum is applied.

4. The apparatus of claim 2 wherein said first and second portions travel a path prescribed, respectively, by a first and second cam track to which said first and second portions are in communication therewith.

5. The apparatus of claim 4 wherein said first and second cam tracks are identical and are of a generally rectangular shape.

6. The apparatus of claim 5 wherein said path travelled by said first and second portions has a part above and a part below said nest and said anvil.

7. The apparatus of claim 1 wherein said punch means is provided with raising and lowering means for raising said punch away from said anvil to permit passage of said deflashed article from said anvil and to permit passage of said article having flash from said nest to said anvil and for lowering said punch means adjacent said anvil whereby said punch means can effect said strike.

8. The apparatus of claim 1 wherein there is additionally provided, at said discharge point, orienting means for orienting said article to a stable position and placing said article onto a conveyor belt.

9. The apparatus of claim 2 wherein there is additionally provided, at said discharge point, orienting means for orienting said article to a stable position and placing said article onto a conveyor belt.

10. The apparatus of claim 9 wherein said article is a hollow, plastic container having a bottom which is in a plane substantially perpendicular to the container center axis and said orienting means rotates said container to a position so that its bottom will be placed on said conveyor belt, and said orienting means comprises:

i. a rack and pinion gear for prescribing the movement of said orienting means, and ii. double acting pneumatic cylinder means for powering said rack.

* * * * *